(12) United States Patent
Hwang et al.

(10) Patent No.: US 11,620,774 B2
(45) Date of Patent: Apr. 4, 2023

(54) GENERATIVE ADVERSARIAL NETWORK (GAN)-BASED SYSTEM FOR GENERATING COLOR IMAGE FROM EDGE IMAGE

(71) Applicant: AJOU UNIVERSITY INDUSTRY—ACADEMIC COOPERATION FOUNDATION, Suwon-si (KR)

(72) Inventors: Won Jun Hwang, Seoul (KR); Dong Yi Kim, Suwon-si (KR); Joon Pyo Hong, Daejeon (KR); Hyung Ho Kim, Anyang-si (KR)

(73) Assignee: AJOU UNIVERSITY INDUSTRY—ACADEMIC COOPERATION FOUNDATION, Suwon-si (KR)

( * ) Notice: Subject to any disclaimer, the term of this patent is extended or adjusted under 35 U.S.C. 154(b) by 268 days.

(21) Appl. No.: 16/877,869

(22) Filed: May 19, 2020

(65) Prior Publication Data
US 2020/0372694 A1  Nov. 26, 2020

(30) Foreign Application Priority Data
May 20, 2019  (KR) .......................... 10-2019-0059133

(51) Int. Cl.
*G06T 11/40*  (2006.01)
*G06N 20/00*  (2019.01)

(52) U.S. Cl.
CPC .............. *G06T 11/40* (2013.01); *G06N 20/00* (2019.01)

(58) Field of Classification Search
CPC ......... G06T 11/40; G06T 11/001; G06T 7/10; G06T 7/90; G06T 2207/20081; G06N 20/00; G06N 3/0472; G06N 3/08; G06N 3/0454
See application file for complete search history.

(56) References Cited

U.S. PATENT DOCUMENTS

| 11,308,714 | B1* | 4/2022 | Christoudias ........ G06V 20/176 |
| 2018/0089889 | A1* | 3/2018 | Gros ..................... H04N 1/6008 |
| 2018/0342084 | A1 | 11/2018 | Yonetsuji |
| 2020/0327675 | A1* | 10/2020 | Lin ......................... G06T 7/194 |

OTHER PUBLICATIONS

Ren et al, (Automatic Sketch Colorization with Tandem Conditional Adversarial Networks, 2018 IEEE, pp. 11-15 (Year: 2018).*
Communication dated Feb. 24, 2021, issued by the Korean Patent Office in counterpart Korean Application No. 10-2019-0059133.
(Continued)

*Primary Examiner* — Amara Abdi
(74) *Attorney, Agent, or Firm* — Sughrue Mion, PLLC

(57) ABSTRACT

A generative adversarial network (GAN)-based system for generating a color image from an edge image includes: a first GAN training a model for converting the edge image into an intermediate image; and a second GAN training a model for converting the intermediate image into the color image, wherein an entropy of the intermediate image corresponds to a value between an entropy of the edge image and an entropy of the color image.

5 Claims, 5 Drawing Sheets

(56) References Cited

OTHER PUBLICATIONS

Hui Ren et al., "Automatic Sketch Colorization with Tandem Conditional Adversarial Networks", 11th International Symposium on Computational Intelligence and Design, vol. 1, 2018, pp. 11-15.
Yifan Liu et al., "Auto-painter: Cartoon Image Generation from Sketch by Using Conditional Generative Adversarial Networks", arXiv preprint, arXiv:1705.01908v2, May 7, 2017, 12 pages total.
Communication dated Aug. 20, 2020, issued by the Korean Intellectual Property Office in application No. 10-2019-0059133.

* cited by examiner

GENERATIVE ADVERSARIAL NETWORK (GAN)-BASED SYSTEM FOR GENERATING COLOR IMAGE FROM EDGE IMAGE

CROSS-REFERENCE TO RELATED APPLICATION

This application claims the benefit of Korean Patent Application No. 10-2019-0059133, filed on May 20, 2019, in the Korean Intellectual Property Office, the disclosure of which is incorporated herein in its entirety by reference.

BACKGROUND

1. Field

One or more embodiments relate to a generative adversarial network (GAN)-based system for generating a color image from an edge image.

2. Description of Related Art

Recently, webtoons have established themselves as snack cultures that may be easily enjoyed regardless of age. Media mixing such as dramatization or cinematization of various webtoons has been actively progressed, and the size and diversity of the webtoon market has been further enhanced due to the development of paid platforms. Accordingly, the market demand for coloring the existing black-and-white published cartoons has increased, and the demand for technology of automatically coloring the sketches of images has increased to improve the productivity of webtoon artists.

However, in the case of the existing automatic coloring technology, when the area of an object is wide, a plurality of different colors may be painted on the same object in spite of the same object, or when an edge forming a face covers a particular object, the left and right sides of the object divided by the edge forming the face may be painted with different colors.

SUMMARY

One or more embodiments include a generative adversarial network (GAN)-based system for generating a color image from an edge image. The technical problems to be solved by the disclosure are not limited to the technical problems described above, and other technical problems may be derived from the following embodiments.

Additional aspects will be set forth in part in the description which follows and, in part, will be apparent from the description, or may be learned by practice of the presented embodiments of the disclosure.

According to one or more embodiments, a generative adversarial network GAN)-based system for generating a color image from an edge image includes: a first GAN training a model for converting the edge image into at least one intermediate (or interim) image; and a second GAN training a model for converting the intermediate image into the color image, wherein an entropy of the intermediate image corresponds to a value between an entropy of the edge image and an entropy of the color image.

Also, the intermediate image may correspond to at least one of a gray image and a luminance component image.

Also, the luminance component image may include only data corresponding to a Y component corresponding to a value obtained by scaling a brightness of light to a range of 0 to 255 in a YUV color space.

Also, the first GAN may include: a first generator training a model for converting the edge image into the intermediate image; and a first discriminator training a model for discriminating between an image generated by the first generator and a sample image representing the intermediate image.

Also, the first generator may include: a first encoder including a plurality of convolution layers; and a first decoder including a plurality of deconvolution layers, wherein an intermediate result image generated when the edge image passes through at least one of the plurality of convolution layers in the first encoder may be used as an input image of the first decoder.

Also, the second GAN may include: a second generator training a model for converting the intermediate image into the color image; and a second discriminator training a model for discriminating between an image generated by the second generator and a sample image representing the color image.

According to one or more embodiments, a method of operating a generative adversarial network (GAN)-based system for generating a color image from an edge image includes: training a model for converting the edge image into at least one intermediate image; and training a model for converting the intermediate image into the color image, wherein an entropy of the intermediate image corresponds to a value between an entropy of the edge image and an entropy of the color image.

According to one or more embodiments, a non-transitory computer-readable recording medium stores a program that, when executed by a computer, performs the above method.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
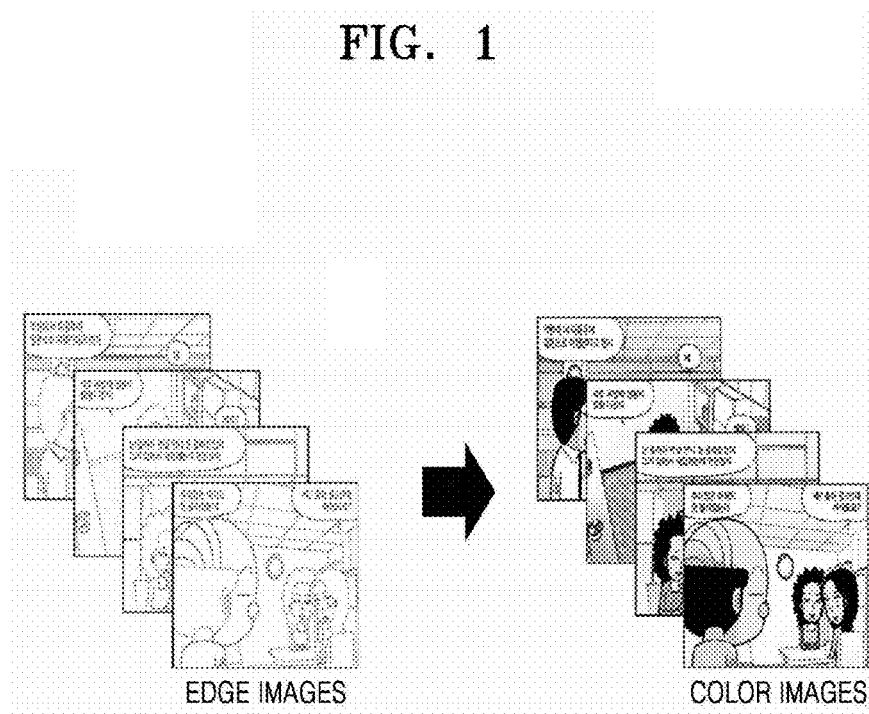
FIG. 1 is a diagram illustrating an example of generating a color image from an edge image.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the terms used herein, so far as possible, widely-used general terms are selected in consideration of functions in the embodiments; however, these terms may vary according to the intentions of those skilled in the art, the precedents, or the appearance of new technology. Also, in some cases, there may be terms that are optionally selected, and the meanings thereof will be described in detail in the corresponding portions of the description of the embodiment. Therefore, the terms used herein are not simple terms and should be defined based on the meanings thereof and the overall description of the embodiments.

In the descriptions of the embodiments, when an element is referred to as being "connected" to another element, it may be "directly connected" to the other element or may be "electrically connected" to the other element with one or more intervening elements therebetween. Also, when something is referred to as "including" a component, another component may be further included unless specified otherwise.

The term such as "comprise" or "include" used herein should not be construed as necessarily including all of the elements or operations described herein, and should be construed as not including some of the described elements or operations or as further including additional elements or operations.

The following description of embodiments should not be construed as limiting the scope of the disclosure, and those that may be easily inferred by those of ordinary skill in the art should be construed as being included in the scope of the embodiments. Hereinafter, embodiments will be described in detail merely as examples with reference to the accompanying drawings.

FIG. 1 is a diagram illustrating an example of generating a color image from an edge image.

The edge may be a portion where the brightness changes suddenly and may mean a boundary line or an outline. The edge image may be an image formed of only boundary lines or outlines without being colored and, for example, may correspond to a sketch drawn by a webtoon artist.

When a color image is generated through a process of coloring an edge image directly by a person, it may be inefficient in terms of time and cost. Thus, a machine learning method is proposed to output a color image by inputting an edge image. As an example of the machine learning method, a generative adversarial network (GAN)-based method is proposed, which will be described below in detail with reference to FIG. 2.

Figure 2:
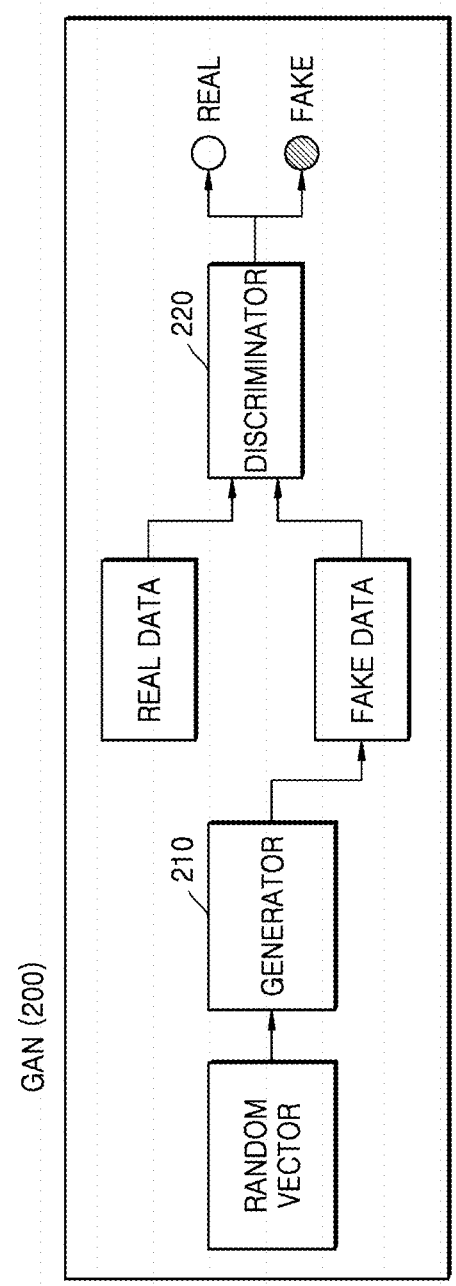
FIG. 2 is a diagram for describing an example of a method of operating a generative adversarial network (GAN)

FIG. 2 is a diagram for describing an example of a method of operating a generative adversarial network (GAN).

A GAN 200 may be a learning network and may include a generator 210 as a model taking charge of regression generation and a discriminator 200 as a model taking charge of discrimination. The GAN 200 may be a model in which the generator 210 and the discriminator 220 compete with each other and improve their respective performances.

In the GAN 200, a process of first training the discriminator 220 and then training the generator 210 may be repeated. The discriminator 220 may be trained in two stages. First, the GAN 200 may input real data into the discriminator 220 to train the discriminator 220 to discriminate the data as real. Second, the GAN 200 may input fake data generated by the generator 210 into the discriminator 220 to train the discriminator 220 to discriminate the data as fake. Through this process, the discriminator 220 may have the ability to discriminate real data as real and fake data as fake. After the discriminator 220 is trained, the generator 210 may be trained in a direction to deceive the trained discriminator 220. That is, the generator 210 may be trained to generate fake data, which has been generated from a random vector, to be similar to real data such that the discriminator 220 may discriminate the fake data as real.

As this training process is repeated, the discriminator 220 and the generator 210 may recognize each other as adversarial competitors and develop all; as a result, the generator 210 may generate fake data that is almost identical to real data, and accordingly, the discriminator 220 may not discriminate between the real data and the fake data. That is, in the GAN 200, the generator 210 may try to reduce the probability of success in discrimination and the discriminator 220 may try to increase the probability of success in discrimination such that they may competitively develop each other.

Figure 3:
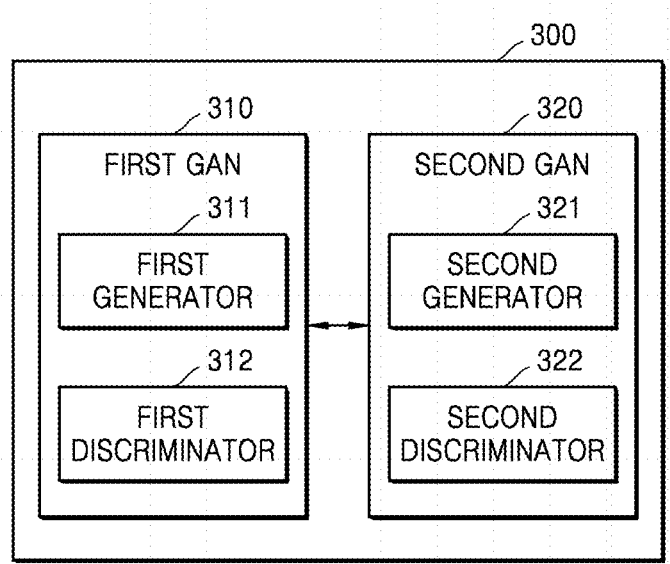
FIG. 3 is a diagram illustrating an example of a GAN-based system for generating a color image from an edge image.

FIG. 3 is a diagram illustrating an example of a GAN-based system for generating a color image from an edge image.

Pix2Pix, which is a system for coloring an edge image by using an existing GAN, may exhibit stable performance; however, because it exaggeratively expresses an object or a subject, there may be a problem when it is applied to the webtoon that enlargedly expresses a particular portion to be emphasized over an overall image. For example, when the area of an object is wide, a plurality of different colors may be painted on the same object in spite of the same object, or when an edge of a face covers a particular object, the left and right sides of the object divided by the edge of the face may be painted with different colors. That is, in the process of outputting a color image with a high entropy level by inputting an edge image with a low entropy level, it may be difficult to set an accurate initial value to the edge image, and when there is any blocked portion, it may be colored in a wrong color.

Thus, the disclosure proposes a GAN-based system that first generates at least one intermediate image with an entropy level between the entropy level of an edge image and the entropy level of a color image from the edge image with a low entropy level and then generates a color image with a high entropy level from the intermediate image, instead of directly outputting a color image with a high entropy level from the edge image with a low entropy level.

Referring to FIG. 3, a GAN-based system 300 for generating a color image from an edge image may include a first GAN 310 and a second GAN 320.

The first GAN 310 may train a model for converting an edge image into at least one intermediate image. Also, the second GAN 320 may train a model for converting the intermediate image into the color image. In this case, the entropy level of the intermediate image may be between the entropy level of the edge image and the entropy level of the color image.

For example, the intermediate image may correspond to a gray scale image or a luminance component image. The gray scale image may mean an image in which the value of each pixel represents the amount of light. The luminance may mean the brightness of light that a surface with a certain area emits by itself or transmits or reflects, and the luminance component image may correspond to, for example, an image including only data corresponding to a Y component corresponding to a value obtained by scaling the brightness of light to a range of 0 to 255 in a YUV color space. The YUV color space may be a method of processing an image by separating the brightness and chromatic aberration of colors by using the singularity of the human retina, in which a Y component may be a luminance component and may be used to store brightness information and a U component and a V component may represent chrominance and may be used to express color.

Meanwhile, the intermediate image may also correspond to an image including only data corresponding to any one color component of R, G, or B in the RGB color space and may correspond to various other images with entropy levels between the entropy level of the edge image and the entropy level of the color image.

The first GAN may include a first generator training a model for converting an edge image into an intermediate image and a first discriminator training a model for discriminating between an image generated by the first generator and a sample image representing the intermediate image. The first discriminator may be trained to discriminate the sample image representing the intermediate image as real and discriminate the image generated by the first generator as fake. The sample image representing the intermediate image may be generated through conversion from a sample image representing a color image to a gray scale or to a YUV format. This will be described below in detail with reference to FIG. 4. Also, the first generator may be trained to generate an image similar to the sample image representing the intermediate image such that the first discriminator may discriminate the image generated by the first generator as real.

Also, the second GAN may include a second generator training a model for converting at least one intermediate image into a color image and a second discriminator training a model for discriminating between an image generated by the second generator and a sample image representing the color image. Likewise, the second discriminator may be trained to discriminate the sample image representing the color image as real and discriminate the image generated by the second generator as fake. Also, the second generator may be trained to generate an image similar to the sample image representing the color image such that the second discriminator may discriminate the image generated by the second generator as real.

Figure 4:
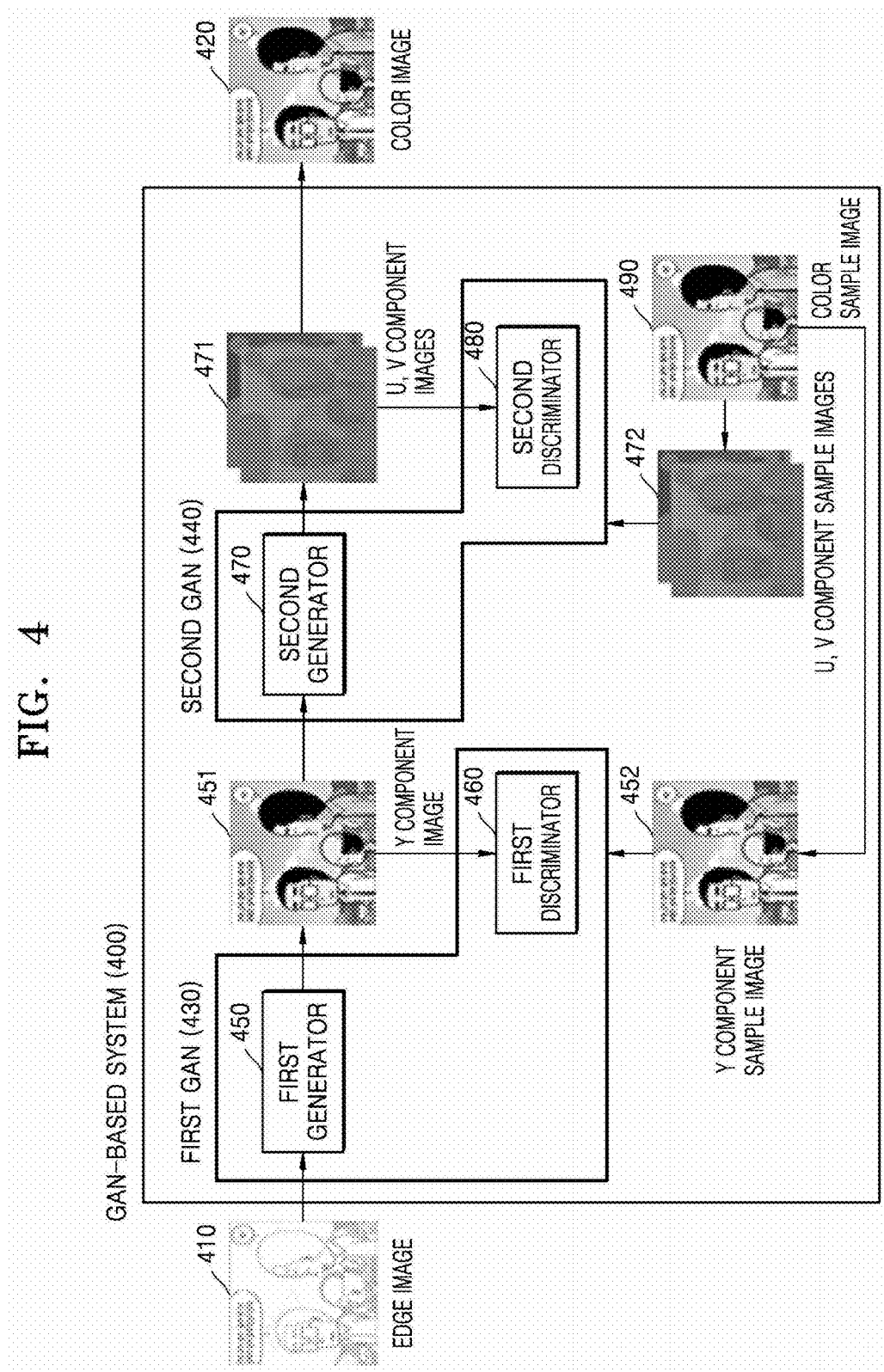
FIG. 4 is a diagram for describing an operation of a GAN-based system for generating a color image from an edge image.

FIG. 4 is a diagram for describing an operation of a GAN-based system for generating a color image from an edge image.

Referring to FIG. 4, an edge image 410 may be input into a GAN-based system 400 to finally generate a color image 420. The GAN-based system 400 may include a first GAN 430 and a second GAN 440. Also, the first GAN 430 may include a first generator 450 and a first discriminator 460, and the second GAN 440 may include a second generator 470 and a second discriminator 480.

First, the first generator 450 of the first GAN 430 may generate a Y component image 451 as an intermediate image from the edge image 410. The Y component image 451 may correspond to an image including only data corresponding to a Y component corresponding to a value obtained by scaling the brightness of light to a range of 0 to 255 in the YUV color space.

The first discriminator 460 of the first GAN 430 may be trained to discriminate the Y component image 451 generated by the first generator 450 as fake and discriminate a Y component sample image 452 generated through conversion from a sample image 490 representing a color image to a YUV format as real. The Y component sample image 452 may be generated by converting the sample image 490 representing the color image based on Equation 1 below. However, the conversion method is not limited to Equation 1 below and may be based on various conversion methods.

$$Y = 0.229R + 0.587G + 0.114B \quad \text{[Equation 1]}$$

Accordingly, the first generator 450 of the first GAN 430 may be trained to generate an image similar to the Y component sample image 452 such that the first discriminator 460 may discriminate an image generated by the first generator 450 as real.

The second generator 470 of the second GAN 440 may generate U, V component images 471 from the Y component images 451. The U component and the V component may express color, and particularly, the U component may correspond to a value obtained by subtracting a brightness component from a blue color and the V component may correspond to a value obtained by subtracting a brightness component from a red color.

The second discriminator 480 of the second GAN 440 may be trained to discriminate the U, V component images 471 generated by the second generator 470 as fake and discriminate U, V component sample images 472 generated through conversion of the sample image 490 representing the color image to a YUV format as real. The U, V component sample images 472 may be generated by converting the sample image 490 representing the color image based on Equation 2 below. However, the conversion method is not limited to Equation 2 below and various conversion methods may be used.

$$\begin{aligned} U &= 0.492(B-Y) \\ &= -0.14713R - 0.28886G + 0.436B \end{aligned} \quad \text{[Equation 2]}$$

$$\begin{aligned} V &= 0.877(R-Y) \\ &= 0.615R - 0.51499G - 0.10001B \end{aligned}$$

Accordingly, the second generator 470 of the second GAN 440 may be trained to generate an image similar to the U, V component sample images 472 such that the second discriminator 480 may discriminate an image generated by the second generator 470 as real.

Finally, the color image 420 may be generated by converting the Y component image 451 generated by the first generator 450 and the U, V component images 471 generated by the second generator 470, based on Equation 3 below.

$$R = Y + 1.13983V$$

$$G = Y - 0.39465U - 0.58060V$$

$$B = Y + 2.03211U \quad \text{[Equation 3]}$$

Figure 5:
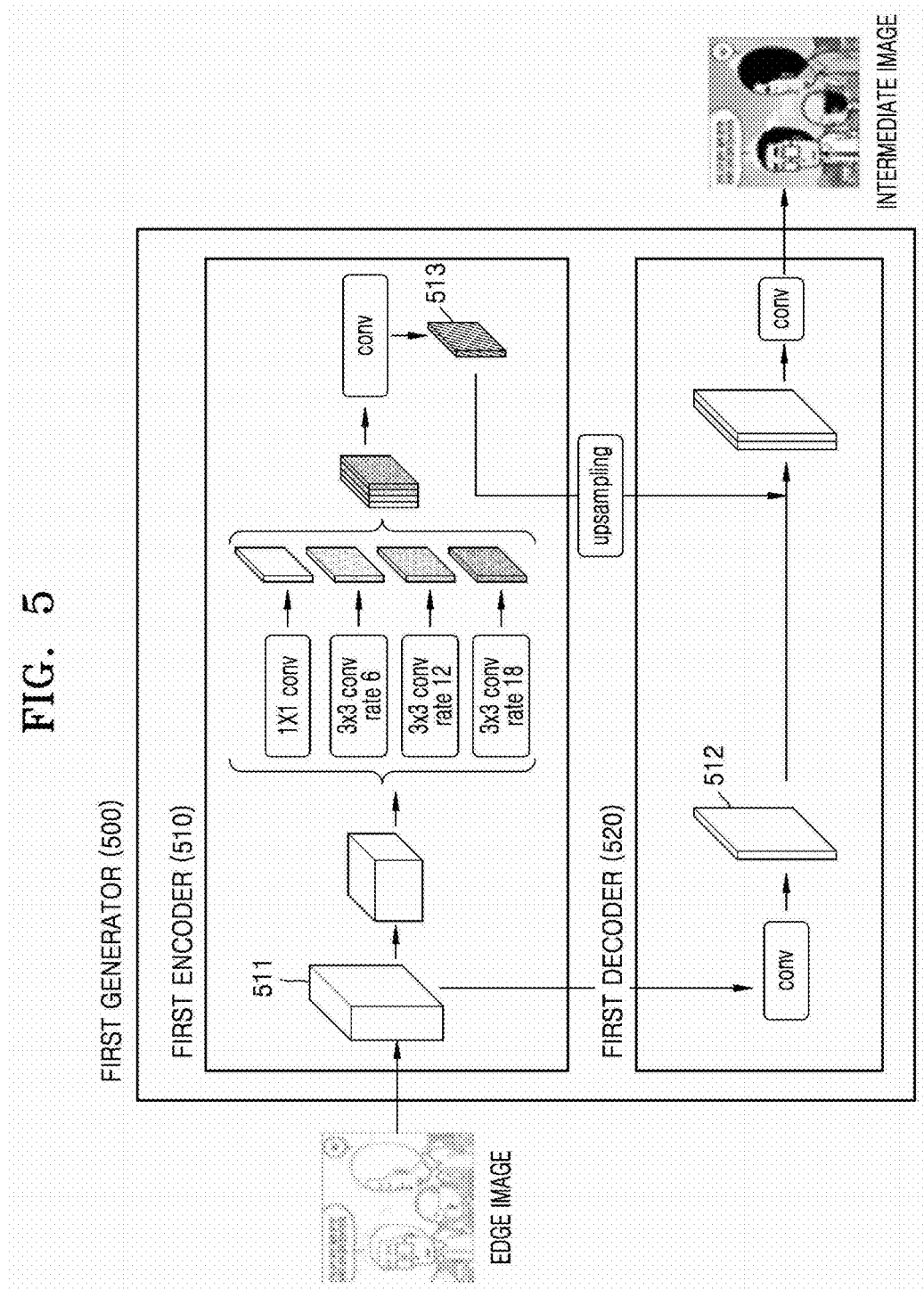
FIG. 5 is a diagram illustrating an example of a first generator including a first encoder and a first decoder.

FIG. 5 is a diagram illustrating an example of a first generator including a first encoder and a first decoder.

Referring to FIG. 5, a first generator 500 may include a first encoder 510 and a first decoder 520.

The first encoder 510 may include a plurality of convolution layers, and the first decoder 520 may include a plurality of deconvolution layers.

In order to improve the performance of the first generator 500, an intermediate result image 511 generated when an edge image input into the first encoder 510 passes through at least one of the plurality of convolution layers may be used as an input image of the first decoder 520.

Also, an image 512 generated through the plurality of deconvolution layers in the first decoder 520 by using the intermediate result image 511 as an input image and an image obtained by upsampling an image 513 finally generated in the first encoder 510 may be combined. The combined image may be output as an intermediate image through, for example, a 1×1 convolution layer.

Meanwhile, the plurality of convolution layers of the first encoder 510 may include at least one dilated convolution layer. The dilated convolution layer may be a layer in which a dilation rate defining an interval between kernels is introduced. For example, a 3×3 kernel with a dilation rate of 2 may have the advantage of having the same view as a 5×5 kernel while using 9 parameters. As such, the first encoder 510 may improve the performance of global encoding by including at least one dilated convolution layer.

The above embodiments of the disclosure may be written as computer programs and may be implemented in general-purpose digital computers that execute the programs using a computer readable recording medium. Also, the data structure used in the above embodiment of the disclosure may be written on a computer-readable recording medium through various means. Examples of the computer-readable recording medium may include storage mediums such as magnetic storage mediums (e.g., ROMs, floppy disks, and hard disks) and optical recording mediums (e.g., CD-ROMs and DVDs).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A generative adversarial network (GAN)-based system for generating a color image from an edge image, the GAN-based system comprising:
   a first GAN training a model for converting the edge image into at least one intermediate image; and
   a second GAN training a model for converting the intermediate image into the color image,
   wherein an entropy of the intermediate image corresponds to a value higher than an entropy of the edge image, and the entropy of the intermediate image corresponds to a value lower than an entropy of the color image,
   wherein the first GAN includes:
      a first generator training a model for converting the edge image into the intermediate image; and
      a first discriminator training a model for discriminating between an image generated by the first generator and a sample image representing the intermediate image,
   wherein the first generator includes a first encoder including a plurality of convolution layers,
   wherein the plurality of convolution layers of the first encoder include at least one dilated convolution layer, and
   wherein the at least one dilated convolution layer is a layer in which a dilation rate defining an interval between kernels is introduced.

2. The GAN-based system of claim 1, wherein the intermediate image corresponds to at least one of a gray image and a luminance component image.

3. The GAN-based system of claim 2, wherein the luminance component image includes only data corresponding to a Y component corresponding to a value obtained by scaling a brightness of light to a range of 0 to 255 in a YUV color space.

4. The GAN-based system of claim 1, wherein the first generator further includes:
   a first decoder including a plurality of deconvolution layers,
   wherein an intermediate result image generated when the edge image passes through at least one of the plurality of convolution layers in the first encoder is used as an input image of the first decoder.

5. The GAN-based system of claim 1, wherein the second GAN includes:
   a second generator training a model for converting the intermediate image into the color image; and
   a second discriminator training a model for discriminating between an image generated by the second generator and a sample image representing the color image.

* * * * *